United States Patent
Raspail

(10) Patent No.: US 12,037,176 B2
(45) Date of Patent: Jul. 16, 2024

(54) SUSTAINABLE BLISTER PACKAGING

(71) Applicant: GSK Consumer Healthcare SARL, Prangins (CH)

(72) Inventor: Vincent Jean-Pierre Raspail, Prangins (CH)

(73) Assignee: HALEON CH SARL, Prangins (CH)

( * ) Notice: Subject to any disclaimer, the term of this patent is extended or adjusted under 35 U.S.C. 154(b) by 0 days.

(21) Appl. No.: 17/768,518

(22) PCT Filed: Oct. 12, 2020

(86) PCT No.: PCT/EP2020/078629
§ 371 (c)(1),
(2) Date: Apr. 13, 2022

(87) PCT Pub. No.: WO2021/074082
PCT Pub. Date: Apr. 22, 2021

(65) Prior Publication Data
US 2024/0109706 A1    Apr. 4, 2024

(30) Foreign Application Priority Data

Oct. 14, 2019   (EP) ..................... 19203030

(51) Int. Cl.
*B65D 75/36*        (2006.01)
*B65D 75/58*        (2006.01)

(52) U.S. Cl.
CPC ....... *B65D 75/367* (2013.01); *B65D 75/5855* (2013.01); *B65D 2301/20* (2013.01); *B65D 2575/362* (2013.01); *B65D 2585/56* (2013.01)

(58) Field of Classification Search
CPC ............. B65D 75/367; B65D 75/5855; B65D 2301/20; B65D 2575/362; B65D 2585/56
(Continued)

(56) References Cited

U.S. PATENT DOCUMENTS 9,962,913 B2    5/2018 Osborn et al.
2008/0131636 A1*  6/2008 Kinigakis ............. B65D 33/16
                                                         428/323

(Continued)

FOREIGN PATENT DOCUMENTS

CN    101316702 A    12/2008
CN    104169187 A    11/2014
(Continued)

*Primary Examiner* — Jacob K Ackun

(57) ABSTRACT

A blister packaging comprises a thermoformed web (30) with cavities (10) for a product formed therein, comprising at least two co-extruded layers: a main layer (34) comprising HDPE and up to 2% of a first additive, and a sealing layer (36) comprising HDPE and at most 50% of LLDPE, and a flat lid (20), comprising at least three co-extruded layers: an outer HDPE layer (22) containing up to 5% of a second additive, an intermediate HDPE layer (24) comprising a third additive suitable to decrease elongation at break, and an inner sealing layer (26), wherein the thermoformed web (30) and the flat lid (20) are heat-sealed together. The invention further relates to a packaged pharmaceutical or nutritional product comprising a comprising such a blister packaging, and a pharmaceutical or nutritional product (40) in solid form contained in the cavities. It further relates to a method for producing such a product.

19 Claims, 2 Drawing Sheets

(58) Field of Classification Search
USPC ...... 206/532, 528, 538, 524.1, 524.2, 524.3, 206/524.6
See application file for complete search history.

(56) References Cited

U.S. PATENT DOCUMENTS

| | | |
|---|---|---|
| 2008/0251411 A1 | 10/2008 | Walker |
| 2010/0170820 A1* | 7/2010 | Leplatois ............... B32B 27/306 156/324 |
| 2011/0049003 A1* | 3/2011 | Bellamah ................ B32B 27/08 205/183 |
| 2013/0095336 A1* | 4/2013 | Hermel-Davidock ...................... B32B 27/32 428/516 |
| 2015/0298439 A1 | 10/2015 | Osborn et al. |
| 2015/0368018 A1* | 12/2015 | Broedsgaard ........ B65D 75/367 53/478 |
| 2017/0158400 A1 | 6/2017 | Priscal |
| 2018/0153769 A1* | 6/2018 | Dey ..................... B65D 75/327 |
| 2019/0337694 A1* | 11/2019 | Dontula ................. B32B 37/15 |

FOREIGN PATENT DOCUMENTS

| | | |
|---|---|---|
| CN | 104837620 A | 8/2015 |
| JP | 2017-100419 A | 6/2017 |
| JP | 6175425 B2 | 8/2017 |

\* cited by examiner

SUSTAINABLE BLISTER PACKAGING

This application is a 371 of International Application No. PCT/EP2020/078629, filed 12 Oct. 2020, which claims the priority of EP 19203030.2, filed 14 Oct. 2019.

TECHNICAL FIELD

This invention relates to a sustainable blister packaging comprising two multilayer films, and to a method for producing such a blister packaging containing a pharmaceutical or nutritional product.

BACKGROUND

Blisters are frequently used as a packaging for pharmaceutical or nutritional products in solid forms (e.g. tablets, caplets, lozenges, gel tabs, gums). Conventional blisters comprise a thermoformed web with cavities for a product formed therein, and a lid sealed onto the web, thereby closing the cavities. The blisters provide a good physical protection, and, depending on the materials used, can provide an oxygen and/or moisture barrier to prevent any degradation of the products contained therein. Blisters also allow for one product, i.e. one single dose of a medication for example, to be removed without alteration of the packaging of the other products.

There are several challenges around blister packaging. One challenge is that, at least for pharmaceutical products, the packaging should preferably be child-resistant, i.e. opening the blister packaging is difficult for children, so that they cannot access the content. At the same time, package opening must be easy enough for elderly consumers or people suffering from joint degeneration or other illnesses affecting their dexterity. A packaging fulfilling these criteria is generally referred to as Child Resistant Senior Friendly (CRSF). Detailed criteria for CRSF certification is defined in the European standard for non-reclosable child resistant packages for pharmaceutical products ISO14375 or the corresponding US standard CFR Title 16, Part 1700.20. For blisters, the consumer has to break the lid to access the product. This is done by pressing onto the thermoformed web where a cavity is formed until the solid product contained in the cavity breaks the lid. The ease of opening depends largely on the material properties of the film used for the lid, and balancing the competing goals of CRSF can be difficult.

Another challenge around blister packaging is sustainability. Currently, blisters generally use a bottom film layer and a top film layer sealed together. The bottom film layer wherein cavities for a product are formed, herein referred to as a "web," is typically thermoformed. The bottom film layer is generally based on halogenated polymers such as polyvinyl chloride (PVC), polyvinylidene chloride (PVdC), or on fluorinated polymers as poly(chlorotrifluoroethylene) (PCTFE). However, these polymers can generate dangerous by-products during production, processing and disposal, and are thus not the preferred solution from an environmental standpoint. Non-halogenated alternatives are also available on the market, such as polyethylene terephthalate (PET), polypropylene (PP), or multilayer structures based on olefins including barrier layers, as described for example in U.S. Pat. No. 9,962,913 or EP2520615B1.

The top film layer, generally and herein referred to as a "lid," is typically an aluminium foil coated with a heat seal layer on one side, and a lacquer on the opposite other side to prevent damage to the aluminium. To comply with the above-mentioned CSRF requirements, this lacquer can also be completed by a reinforcement layer to increase the force required to open the blister. This replacement layer can be paper-based or based on a polymer like polyethylene terephthalate (PET).

The lid and web are typically bonded together via heat-sealing and are extremely difficult to separate due to the high affinity of the heat seal layer of the lid and the material of the web. The heat seal can be done using a heated sealing roll or a heated sealing plate. The resulting blisters are thus made from a combination of aluminium and a polymer, which poses recycling challenges.

For example, blisters having an aluminium lid and thermoformed polymer web cannot be mechanically recycled, and although pyrolytic decomposition could be considered, this method is not available on an industrial scale, requires a high amount of energy, and, in the case of halogenated polymer, requires specific treatment to limit toxic fumes generated by these polymers during the recycling process.

One of the commercially proposed alternatives to these conventional blisters based on an aluminium lid and a halogenated thermoformed web are blisters using a Polypropylene (PP) web and a PP lid, such as the commercially available Etimex Purelay®. Such PP blisters are recyclable without having to separate the lid and web, as both components are made of the same polymer. However, specific equipment is required for thermoforming PP, drastically increasing manufacturing cost. Furthermore, it is difficult to achieve good sealing adhesion of a PP lid on a PP web. This makes it particularly difficult to obtain a CRSF certification for a blister based on a PP web and a PP lid.

Therefore, at least one of the problems underlying the present invention is the creation of a blister for pharmaceutical and nutritional products that provides the physical protection and barrier properties of conventional blisters, but is more environmentally friendly, complies with child-resistant senior-friendly standards, and can be manufactured and processed at competitive cost.

Therefore there is a need to develop improved materials, methods, and devices that can overcome one or more of the above limitations presented by conventional blister design.

Materials, methods, and devices described herein improve one or more of these limitations.

SUMMARY

According to a first aspect of the invention there is provided a blister packaging comprising
- a thermoformed web with cavities for a product formed therein, comprising at least two co-extruded layers, namely a main layer comprising high-density polyethylene (HDPE) and up to 2% of a first additive, and a sealing layer comprising HDPE and at most 50% of linear low-density polyethylene (LLDPE), and
- a flat lid, comprising at least three co-extruded layers, namely an outer HDPE layer containing up to 5% of a second additive, an intermediate HDPE layer comprising a third additive suitable to decrease elongation at break, and an inner sealing layer, wherein the thermoformed web and the flat lid are heat-sealed together.

It should be noted that when the term "an additive" is used herein, this can refer to one additive or to a combination of different additives, with the amounts mentioned herein referring to the total amount of additives in the corresponding layer in the case of a combination.

According to a second aspect of the invention, a packaged pharmaceutical or nutritional product comprising such a blister packaging and a pharmaceutical or nutritional product in solid form, such as a tablet or a caplet, contained in the cavities is provided.

According to a third aspect of the invention, a method for producing such a packaged pharmaceutical or nutritional product comprising such a blister packaging is provided.

According to a preferred embodiment of the invention there is provided a blister packaging comprising a thermoformed web with cavities for a product formed therein, comprising at least two co-extruded layers, namely a main layer comprising high-density polyethylene (HDPE) and up to 2% of a first additive, and a sealing layer comprising HDPE and at most 50% of linear low-density polyethylene (LLDPE), and a flat lid, comprising at least three co-extruded layers, namely an outer HDPE layer containing up to 5% of a second additive, an intermediate HDPE layer comprising a third additive suitable to decrease elongation at break, and an inner sealing layer, wherein the thermoformed web and the flat lid are heat-sealed together.

Preferably, the main layer of the web comprises from 0.2% to 2% of the first additive. Preferably, the sealing layer of the web comprises from 2% to at most 50% of linear low-density polyethylene (LLDPE). Preferably, the outer HDPE layer of the lid contains from 0.2% to 5% of the second additive. Preferably, the intermediate HDPE layer of the lid comprises at least 0.2% of the third additive suitable to decrease elongation at break.

According to a preferred embodiment of the invention, the first additive in the main layer of the web is an inorganic additive.

According to a preferred embodiment of the invention the second additive in the outer HDPE layer of the lid is an inorganic additive.

According to a preferred embodiment of the invention, prior to thermoforming the web has a total thickness of 200-600 μm, preferably 150 to 500 μm, more preferably 250 to 400 μm.

According to a preferred embodiment of the invention, the lid has a total thickness of 30-300 μm, preferably 50 to 200 μm, most preferably 80 to 110 μm.

According to a preferred embodiment of the invention, the overall polyolefin content of the blister packaging without the product is above 90%, preferably above 96%.

According to a preferred embodiment of the invention, the web and the lid both contain an oxygen barrier layer.

According to a preferred embodiment of the invention, the elongation at break of the lid is below 20%, preferably below 10%.

According to a preferred embodiment of the invention, the inner sealing layer of the lid consists mainly of an ethylene copolymer, preferably a copolymer comprising Ethylene and vinyl acetate. According to a preferred embodiment of the invention, the inner sealing layer of the lid has a thickness of about 5 to 30 μm, preferably of about 15 to 25 μm.

According to a preferred embodiment of the invention, the inner sealing layer of the lid (20) comprises up to 2%, preferably up to 1% by weight of a slip agent.

According to a preferred embodiment of the invention, the third additive in the intermediate HDPE layer of the lid is an inorganic additive selected from $CaCO_3$, $TiO_2$, Talc, chalk, clay or a metallic salt.

According to some embodiments of the invention, the third additive in the intermediate HDPE layer of the lid is a polymer which is incompatible with HDPE.

According to a preferred embodiment of the invention, the sealing layer of the thermoformed web comprises 88% to 95% of HDPE and 5%-12% of LLDPE by weight. Preferably, the LLDPE is metallocene LLDPE.

According to a preferred embodiment of the invention, the thermoformed web further comprises an outer layer comprising HDPE as the main ingredient.

HDPE is the main material for the web and the lid, and the complete blister can thus be recycled in a monomaterial recycling stream without a need to separate the lid and the web prior to recycling. Polyethylene (PE) and more specifically High Density Polyethylene (HDPE) is the second most recycled polymer, and thus a good choice from an environmental perspective. It has an excellent mechanical performance, in particular stiffness, and inherently a good moisture barrier performance. Furthermore, it can easily be tailored to the specific needs of a blister packaging by adding additives or other polymers to improve or modify certain characteristics such as the adhesion behavior, barrier properties and perforation characteristics. Contrary to most PP based films, HDPE based films are suitable for thermoforming on standard equipment without plug assist.

The first additive in the main layer of the web improves cuttability of the web and this facilitates processing. Preferably, the first additive is an inorganic additive, but organic nucleating agents can also be used.

The multi-layer structure of the films used for the lid and the web allows it to obtain all desired properties, with each layer bringing specific characteristics such as heat resistance, surface look and feel, moisture or gas barrier, or adhesion strength. Such multi-layer films can be produced by extrusion cast or blown film extrusion at an industrial scale.

The addition of low density polyethylene (LLDPE) to the HDPE of the sealing layer of the web helps to improve its sealing performance, its formability and barrier performance.

To obtain the desired opening force of the lid in order to pass CRSF certification as defined in ISO14375, an additive decreasing elongation at break is added to the intermediate HDPE layer of the lid, also referred to as "third additive" herein.

One way to do so can be to adjust the lid thickness, another one is to adjust the elongation at break and the strength at break of the film.

It should be noted that all polymers used in the blister packaging of the present invention, especially polyethylene, can originate from non-renewable sources such as crude oil, or from renewable sources such as recycled animal or vegetable oil, corn starch, sugar canes, etc. (bio-based polymer or renewable-based polymers).

According to a preferred embodiment, prior to thermoforming the web has a total thickness of 200-600 μm, preferably 150 to 500 μm, more preferably 250 to 400 μm. Also, according to a preferred embodiment the lid has a total thickness of 30-300 μm, preferably 50 to 200 μm, most preferably 80 to 110 μm. The total thickness of the blister packaging (between the cavities) is preferably in a range of from 400-600 μm. Regarding the thickness of the thermoformed web, this thickness is sufficient to provide good thermoforming quality, including enough remaining thickness after the thermoforming at the top of the cavity to prevent any failure (perforation or breakage). The thickness of the lid is optimised namely to achieve an easy opening while still passing the child resistance certification.

In some cases, the overall polyolefin content of the blister packaging once the product has been removed is above 90%, preferably above 96% in some embodiments. This allows recycling in a monomaterial recycling stream in some cases, where high quality recycled polyethylene materials can be obtained.

Preferably, the multilayer structures of the web and the lid are obtained by co-extrusion blowing or co-extrusion casting.

Depending on the packaged products and its stability, an additional oxygen barrier may be needed. In this case, the web and the lid may contain an oxygen barrier layer such as ethylene vinyl alcohol (EVOH) or any other oxygen barrier layer as known in the art.

According to a preferred embodiment, the elongation at break of the lid is below 20%, preferably below 10%. As already mentioned above, in some instances, this allows a desired opening force required for CSRF certification. Furthermore, this allows for a "clean" opening, where removal of one product does not unintentionally lead to an opening of other cavities. Preferably, the elongation at break is below 10%. In some embodiments, the lid comprises a thickness of around 100 μm with an elongation at break being below 20% or below 10%. Preferably the tensile strength at break is between 10 MPa and 50 MPa, more preferably between 20 MPa and 30 MPa. In some embodiments, the lid is isotropic. For instance, in some cases the lid has similar properties in each direction, i.e. a variation of properties depending of the direction which can be introduced by some processes, is minimized.

According to another preferred embodiment, the sealing layer of the lid consists or comprises an ethylene copolymer, preferably a copolymer comprising Ethylene and vinyl acetate. In some cases, the copolymer comprises ethylene-vinyl acetate (EVA) with 28% of vinyl acetate content. In some cases, the ethylene copolymer increases adhesion properties of the lid.

Preferably, the sealing layer of the lid has a thickness of about 5 to 30 μm, more preferably of about 15 to 25 μm.

According to another preferred embodiment, the sealing layer of the lid comprises up to 2%, preferably up to 1% by weight of a slip agent. The role of this slip or antiblocking agent is to reduce the friction during unwinding of the lid film and when the lid is sealed on the thermoformed web, and thereby to avoid potential blocking of the lid film namely during unwinding. In some cases, amids are suitable slip and antiblocking agents, for example the slip agent commercialised by Croda International Plc under the brand name Crodamide™.

According to a preferred embodiment, the second additive in the outer HDPE layer of the lid is an inorganic additive, but organic nucleating agents can also be used.

According to a preferred embodiment, the third additive in the intermediate HDPE of the lid which increases the elongation at break is an inorganic additive, preferably selected from $CaCO_3$, $TiO_2$, Talc, chalk, clay or a metallic salt, or a combination of these. The amount of this additive is preferably below 20% by weight, more preferably from about between 2% to 10% by weight, even more preferably between 3% to 5% by weight, and depends on the additive which is chosen. If a metallic salt is used, this can also serve as a nucleating agent which will improve moisture barrier performance of the lid. Alternatively, according to another preferred embodiment, the additive is a polymer which is chemically incompatible with HDPE, such as polypropylene, ionomer ethylene copolymer known as Surlyn®, or polystyrene. In some instances, the additive achieves clear failure of the film without stretch and while maintaining the opening force of the lid sufficiently high to pass child resistant certification according to the standard 15014375. The intermediate layer of the lid preferably has a thickness of 20 to about 60 μm.

According to a preferred embodiment, the additive in the outer HDPE layer of the lid is $CaCO_3$ in an amount of up to 2% by weight. The outer layer of the multilayer lid film is in direct contact with a heated sealing roll during assembly of the blister, and therefore has a greater heat resistant than the other layers of the film in some instances. The outer layer has a thickness of about 5 to about 30 μm, more preferably about 15 to about 20 μm, and comprises a blend of HDPE with an addition of up to 5%, preferably up to 2%, more preferably around 0.5% by weight of $CaCO_3$. The addition of such an amount of $CaCO_3$ will slightly increase the heat resistance of the HDPE from 140° C. to about 145° C., which allows an increase in the sealing temperature and thus improves the sealing strength of the lid on the web.

A text, logo or pattern can be printed on the outer HDPE layer of the lid. In some cases, a lacquer may be applied on top of the HDPE layer to protect the print.

According to a preferred embodiment, the sealing layer of the thermoformed web comprises 88% to 95% of HDPE and 5%-12% of LLDPE by weight. Preferably, the thickness of this layer prior to thermoforming is about 5 to about 30 μm, more preferably about 15 to about 20 μm. Preferably, the LLDPE is metallocene LLDPE. Preferably the melting flow index (MFI) of the HDPE will be selected within a low viscosity range, e.g. a MFI measured at 190° C. and 2.16 kg between 5 and 20, in order to promote good adhesion. In some instances to further improve the adhesion, a tackifier can be added to the sealing layer.

According to another preferred embodiment, the thermoformed web further comprises an outer layer comprising HDPE as the main ingredient, i.e. comprising 90% HDPE or more. This outer layer can have a thickness of 5 to about 30 μm and may contain colouring agents such as $TiO_2$ for a white appearance.

According to a preferred embodiment of the invention, the first additive in the main layer of the web is an inorganic additive selected from $CaCO_3$, $TiO_2$, Talc, chalk or clay. Nanoscale fillers or metallic salts can also be used. All the additives mentioned can be used alone or in combination. The additives can be added via a masterbatch, and in some cases, the carrier is chemically compatible with HDPE. Preferably, the amount of the first additive in the main layer of the web does not exceed 0.5% by weight. If an inorganic additive is used, then again preferably, the amount of inorganic additive in the main layer of the web does not exceed 0.5% by weight. This amount is sufficient to improve the cuttability of the web film and the resulting blister, thereby ensuring a clean cut at the edges of the blister. As an alternative to inorganic additives, organic nucleating agents can be used. Examples for such organic nucleating agents are ultra high-molecular-weight PE, sisal fibers, high-modulus PE fiber or anthracene, but a variety of nucleating agents which can be used with HDPE are known and commercially available.

The present invention also relates to a packaged pharmaceutical or nutritional product comprising any blister packaging described herein, and a pharmaceutical or nutritional product in solid form, such as a tablet or a caplet, contained in the cavities. The size of the cavity is adjusted to the size of the tablet or caplet, in order to limit movement and prevent mechanical degradation of the tablet or caplet.

According to the present invention, a method for producing a packaged pharmaceutical or nutritional product comprises the following steps:
- preheating a web material comprising at least two co-extruded layers: a main layer comprising HDPE and up to 2% of a first additive, and a sealing layer comprising HDPE and at most 50% of LLDPE,
- thermoforming the web material to form a web with cavities therein,
- introducing a pharmaceutical or nutritional product in solid form, such as a tablet or a caplet, into each cavity,
- preheating a lid material comprising at least three co-extruded layers: an outer HDPE layer containing up to 5% of a second additive, an intermediate HDPE layer comprising a third additive suitable to decrease elongation at break, and an inner sealing layer,
- sealing the inner sealing layer of the lid on the sealing layer of the web between the cavities using a heated sealing roll, and
- cutting the resulting product into blister packaging of the desired format.

In some embodiments, thermoforming described herein is performed using a vacuum to form the pre-heated web material into cavities defined by a suitable mould. Additionally, in some instances mechanical assistance in the form of a plug can be used to press the film into the mould (plug-assist), but preferably the thermoforming is done without plug-assist.

The sealing step is done in a direct heat-sealing process using either a constantly heated heat seal roll in some instances or a heat seal plate in other instances, preferably at a temperature from 100° C. to 160° C., preferably below or equal to 145° C., and preferably at a pressure below or equal to 5 bar, such that the heat seal strength is of sufficient to withstand pressure applied when the solid content is pressed onto the lid to be released. The pressure is preferably applied for a duration from 0.2 to 0.5 seconds.

Preferably, a cooling step follows the thermoforming step so that the product is not introduced into a hot cavity. The sealing step may also be followed by a cooling step in some cases.

A preferred embodiment of the invention will now be described by way of example with reference to the accompanying drawings.

DETAILED DESCRIPTION

Embodiments described herein can be understood more readily by reference to the following detailed description, examples, and figures. Elements, devices, and methods described herein, however, are not limited to the specific embodiments presented in the detailed description, examples, and figures. It should be recognized that the exemplary embodiments herein are merely illustrative of the principles of the disclosed invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "5 to 10" or "5-10" should generally be considered to include the end points 5 and 10.

Where only a maximum amount for an ingredient is disclosed, this should be understood as encompassing all amounts above 0 which are detectable and which the person skilled in the art would consider has having a technical effect.

Figure 1:
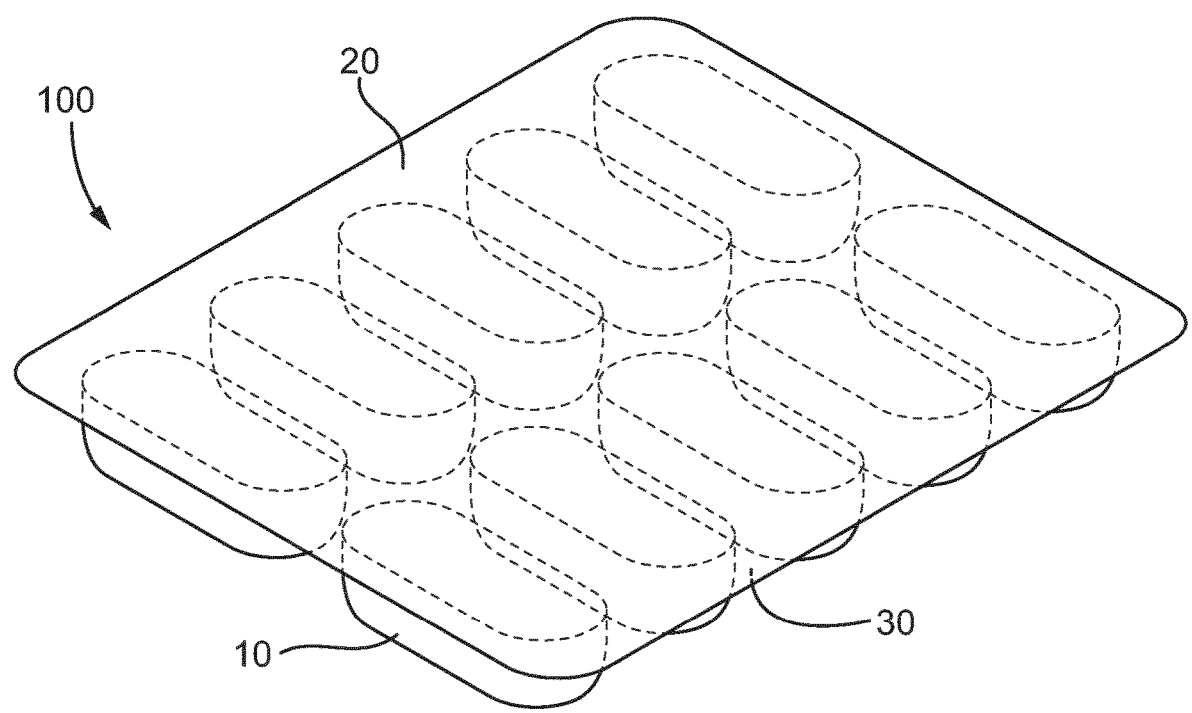
FIG. 1 shows a perspective view of a blister packaging according to the invention containing a product in some cavities.

FIG. 1 shows a perspective view of an exemplary blister packaging 1 with a thermoformed web 30 with cavities 10 formed therein, and a lid 20 sealed on the web 30. The sealing between the lid 20 and the web 30 bonds the lid 20 and web 30 together over the complete contact surface between the lid 20 and the web 30, i.e. everywhere except where cavities 10 are formed.

Figure 2:
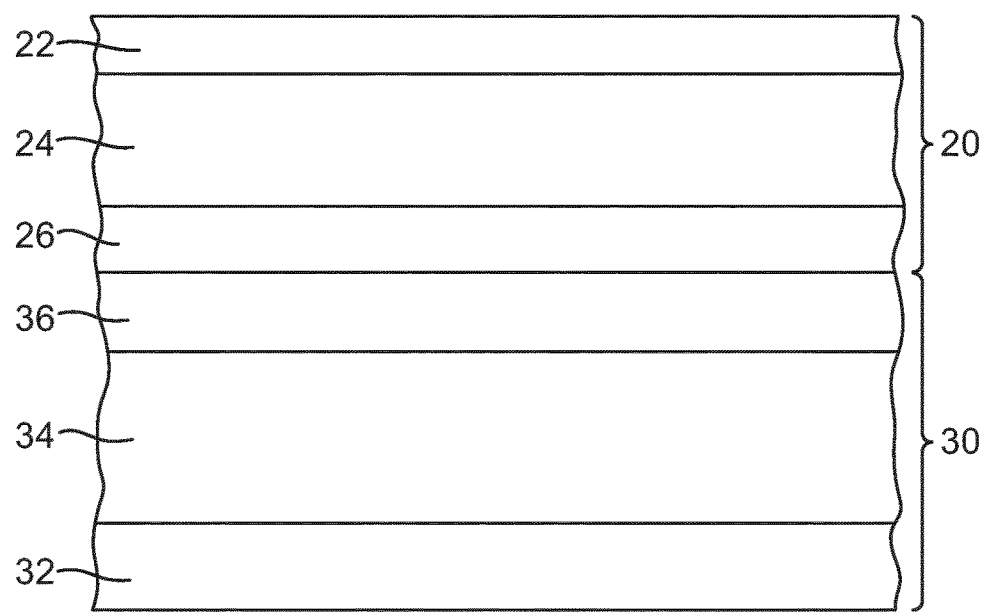
FIG. 2 shows a schematic cross-sectional view of the layered structure of a blister packaging according to the invention.

FIG. 2 shows a schematic cross-sectional view of a multilayered structure present in the blister packaging 1 of FIG. 1 between the cavities 10. The multilayered structure comprises a lid 20 with three layers 22, 24 and 26 sealed onto a web with three layers 32, 34 and 36.

The different layers correspond, from top to bottom, to an outer layer 22, an intermediate layer 24, and a sealing layer 26 for the lid, and then a sealing layer 36, a main layer 34, and an outer layer 32 for the web.

Examples for suitable layer structures are given below. Tables 1 and 3 give examples of suitable layer structures for a lid 20, whereas tables 2 and 4 give examples for suitable layer structures for a web 30. The example lid structures given in tables 1 and 3 can both be combined with each of the example web structures given in tables 2 and 4, i.e. the lid structure of table 1 can be used with the web structure of table 2 or with the web structure of table 4, and the lid structure of table 3 can be used with the web structure of table 2 or with the web structure of table 4.

TABLE 1

Example layer structure for a lid

| Layer | Thickness [microns] | Component(s) | Example component (trade name) | % by weight within layer |
| --- | --- | --- | --- | --- |
| Outer layer | 20 | HDPE | Lyondell basell Alathon M6020SB | 99.5% |
|  |  | CaCO$_3$ |  | 0.5% |
| Intermediate layer | 65 | HDPE | Lyondell basell Alathon M6020SB | 95.00 |
|  |  | Talc | Imerys Luzenac ® R-7 Talc | 5.00 |
| Sealing layer | 15 | EVA 28% | Dow Elvax 265 | 99.60 |
|  |  | Slip agent | Crodamide ER | 0.40 |

TABLE 2

Example layer structure for a web

| Layer | Thickness [microns] | Component(s) | Example component (trade name) | % by weight within layer |
|---|---|---|---|---|
| Sealing layer | 20 | HDPE | HDPE Sabic PCG0863 | 90.00 |
|  |  | mLLDPE | Sabic Supeer 8318 | 10.00 |
| Main layer | 210 | HDPE | Lyondell basell Alathon M6020SB | 99.50 |
|  |  | Talc | Imerys Luzenac ® R-7 Talc | 0.50 |
| Outer layer | 20 | HDPE | Lyondell basell Alathon M6020SB | 100.00 |

TABLE 3

Example layer structure for a lid

| Layer | Thickness [microns] | Component(s) | Example component (trade name) | % by weight within layer |
|---|---|---|---|---|
| Outer layer | 20 | HDPE | Lyondell basell Alathon M6020SB | 99.5% |
|  |  | $CaCO_3$ |  | 0.5% |
| Intermediate layer | 50 | HDPE | Lyondell basell Alathon M6020SB | 97.00 |
|  |  | Nucleating agent | Milliken HYPERFORM ® HPN-20E | 3.00 |
| Sealing layer | 10 | EVA 28% | Dow Elvax 265 | 99.60 |
|  |  | Slip agent | Crodamide ER | 0.40 |

TABLE 4

Example layer structure for a web

| Layer | Thickness [microns] | Component(s) | Example component (trade name) | % by weight within layer |
|---|---|---|---|---|
| Sealing layer | 20 | HDPE | HDPE Sabic PCG0863 | 50.00 |
|  |  | mLLDPE | Sabic Supeer 8318 | 50.00 |
| Main layer | 210 | HDPE | Lyondell basell Alathon M6020SB | 98.00 |
|  |  | Nucleating agent | Milliken HYPERFORM ® HPN-20E | 2.00 |
| Outer layer | 20 | HDPE | Lyondell basell Alathon M6020SB | 100.00 |

In the example of table 1 above, the lid 20 consists of a HDPE outer layer 22 with a thickness of 20 µm which contains 0.5% of $CaCO_3$, an intermediate layer 24 with a thickness of 65 µm which contains 95% HDPE and 5% of talc, and a sealing layer 26 with a thickness of 15 µm which contains 99.6% of EVA 28%, i.e. ethylene-vinyl acetate (EVA) with 28% of vinyl acetate content, and 0.4% of an amide serving as a slip agent. In the example of table 3, the talc in the intermediate layer 24 is replaced by 3% of a nucleating agent.

In the case of the example in table 1, the addition of 5% talc to the HDPE in the intermediate layer 24 decreases elongation at break. The same accounts for the addition of 0.5% $CaCO_3$ to the outer layer 22, and, in the case of the example of table 3, for the addition of 3% of a nucleating agent to the HDPE in the intermediate layer. The resulting elongation at break is below 10% for the complete lid 20 with the structure as given in table 1 and also for the lid with the structure as given in table 3, depending on direction measurement for the lid material, resulting in an opening force that is at the level which is desired for CRSF certification.

In the example of table 2, the web 30 comprises a sealing layer 36 with a thickness of 20 µm and having 90% of HDPE and 10% of metallocene LLDPE to improve adhesion, an HDPE main layer having 99.5% of HDPE with 0.5% of talc and an HDPE only outer layer with a thickness of 20 µm.

In the example of table 2, the material chosen for the main layer 34 may also contain an optional nucleating agent which further improves the moisture barrier.

In the example of table 4, the web 30 comprises a sealing layer 36 with again a thickness of 20 µm, but having 50% of HDPE and 50% of metallocene LLDPE leading to a further improved adhesion as compared to the example for a web of table 2, without leading to sticking issues in manufacturing. Furthermore, the main layer of the example of table 4 has 98% of HDPE and 2% of nucleating agent, namely Milliken HYPERFORM® HPN-20E, which is a 1,2-Cyclohexanedicarboxylic acid, calcium salt:zinc stearate. The main layer has a thickness of 210 µm. The outer layer is again an HDPE only layer with a thickness of 20 µm.

As already mentioned above, additional oxygen barrier layers can be included in or on top of the lid 20 or the web 30 in some embodiments. For the web 30, an EVOH layer (typically in between two bonding layers, also called tie layers) is preferred, because EVOH barrier properties are not altered during thermoforming. For the lid 20, an EVOH layer can also be used in some instances, but coatings providing an oxygen barrier are a suitable alternative in some cases.

Figure 3:
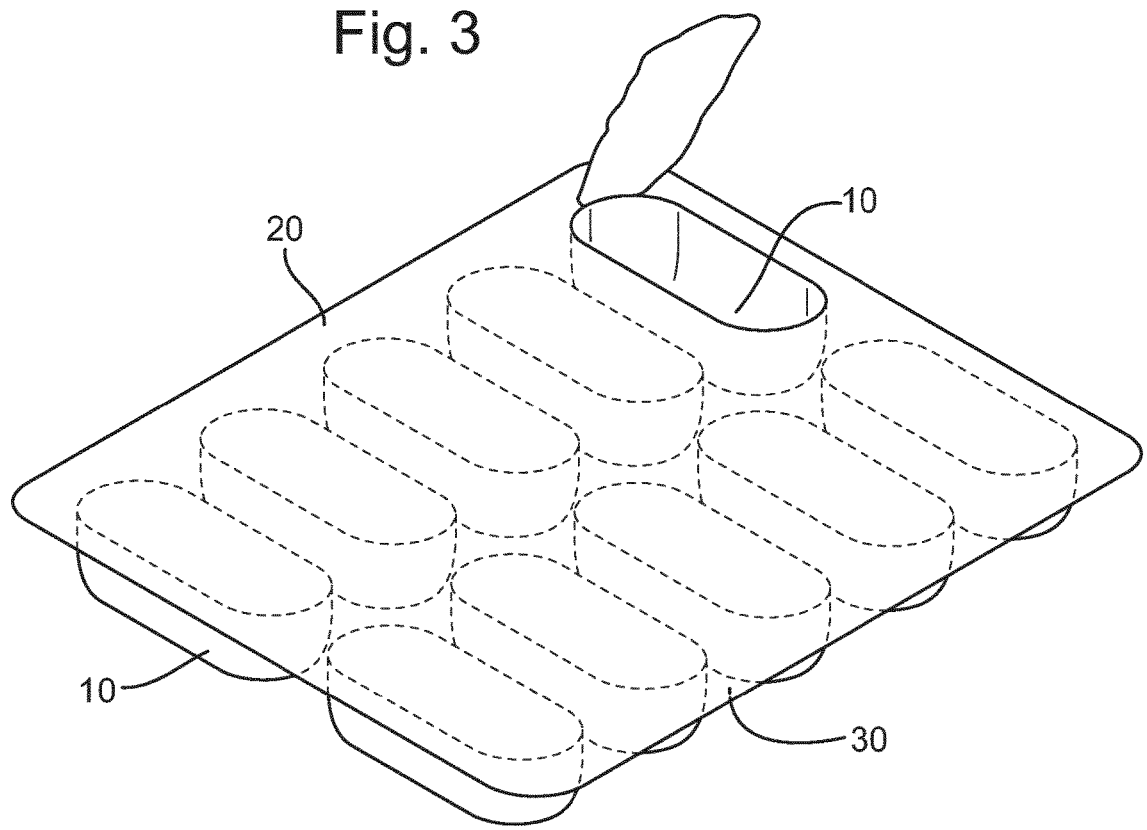
FIG. 3 shows a perspective view of the blister packaging of FIG. 1 after a product has been removed from a cavity.

FIG. 3 illustrates the reaction of the lid 20 when an adult presses on the blister packaging 1 to remove a tablet from the blister. The lid 20 ruptures around the cavity 10, thereby creating an opening through which the tablet can be removed, while leaving all other cavities still covered by the lid material 20, and the sealing between the lid 20 and the web 30 intact.

Figure 4:
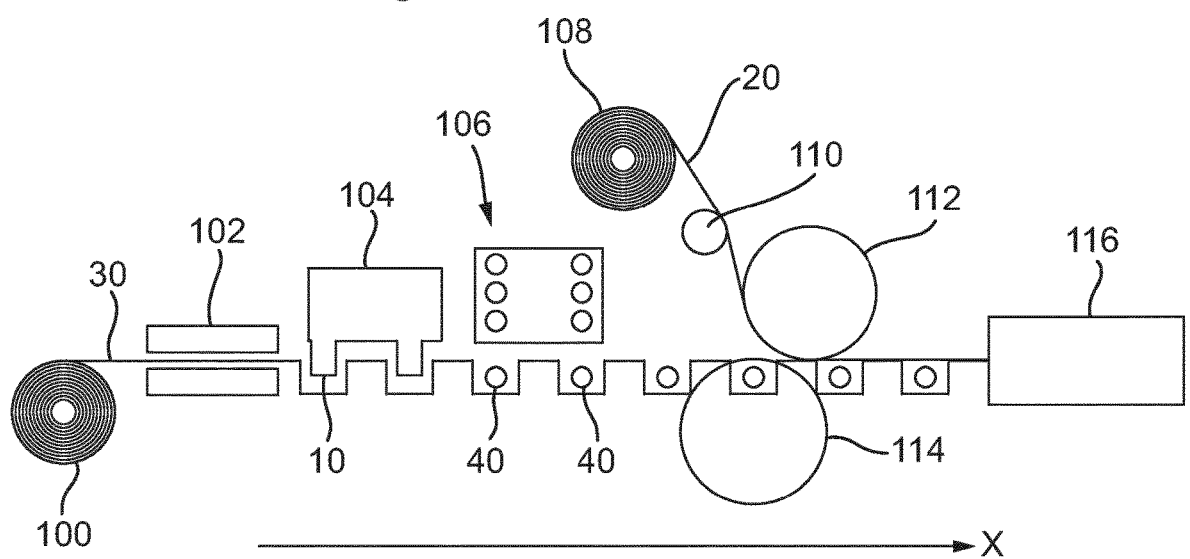
FIG. 4 shows a schematic view of a production line where a packaged pharmaceutical or nutritional product according to the invention is produced.

In another aspect, a method for producing a blister packaging according to the invention containing a product is now described with reference to FIG. 4.

A web film 30 with a thickness of 250 µm is unwound using an unwinder 100, and then pre-heated between two plates at 125° C. at pre-heating station 102 before being thermoformed at a temperature of 130° C. in a thermoforming unit 104. The thermoforming unit 104 is a blister machine from Industria Macchine Automatiche S.P.A. (IMA) designed to produce conventional polyvinyl chloride (PVC) blisters with lid foil of type C80. The line speed can be set up at 250 blisters per minute. After the thermoforming step, the thermoformed web is cooled (not shown in FIG. 4), and a tablet feeder 106 feeds tablets 40 into the cavities 10. A second unwinder 108 unwinds a lid film 20 with 100 µm thickness. The lid film 20 is then pre-heated at the pre-heater roll 110 at a temperature of 110° C. and heat sealed onto the thermoformed web 30 at 140° C. and a pressure of 5 bar pressure using a heat sealing roll 112 and a cooled format roll 114. The direct contact heat seal established a sealing connection between the sealing layer 26 of the lid film 20, and the sealing layer 36 of the thermoformed web film 30. At this sealing step, the lid film 20 and the thermoformed web film 30 are in between a first face of a direct contact heat sealer, namely the heated sealing roll 112, and an opposing second face of direct contact heat sealer, namely the cooled format roll 114. The heated sealing roll 112 makes physical contact with the outer layer 22 of the lid 20, and the cooled format roll 114 makes physical contact with the outer layer 32 of the web 30. Heat and pressure are applied by the heated sealing roll 112, over a defined period of time, to impart the direct contact heat seal between the two films 20,30. The cooled format roll 114 causes a cooldown to a temperature of below 25° C., for example around 12° C., to limit deformation due to plastic behaviour of the thermoformed blister web 30. The cooled format roll 114 is carved out to match the shape of the thermoformed blister in order to obtain a direct contact on the whole surface of the thermoformed cavity.

The combination of thermoformed web 30 with the tablets 40 in the cavities and the lid 20 sealed onto the web 30, can be embossed or printed at this stage to mark variable data, such as a lot number, expiry date, or manufacturing site. The blister is then punched or cut at a cutting station 116 and prepared for packaging.

The heat seal between the thermoformed web 30 and the lid 20 is of sufficient quality to pass leak tests where the complete blister packaging 1 is placed into a vacuum container under 2 bar of depression which has been filled with methylene blue dye mixed with water for a time of 2 minutes.

The invention claimed is:

1. A blister packaging comprising
   a thermoformed web (30) with cavities (10) for a product formed therein, comprising at least two co-extruded layers: a main layer (34) comprising HDPE and up to 2% of a first additive, and a sealing layer (36) comprising HDPE and at most 50% of LLDPE, and
   a flat lid (20), comprising at least three co-extruded layers: an outer HDPE layer (22) containing up to 5% of a second additive, an intermediate HDPE layer (24) comprising a third additive suitable to decrease elongation at break, and an inner sealing layer (26),
   wherein the thermoformed web (30) and the flat lid (20) are heat-sealed together.

2. A blister packaging according to claim 1 characterised in that the first additive in the main layer (34) of the web (30) is an inorganic additive.

3. A blister packaging according to claim 1 characterised in that the second additive in the outer HDPE layer (22) of the lid (20) is an inorganic additive.

4. A blister packaging according to claim 1 characterised in that the first additive in the main layer (34) of the web (30), the second additive in the outer HDPE layer (22) of the lid (20), and the third additive suitable to decrease elongation at break in the intermediate HDPE layer (24) of the lid, are all present in an amount of at least 0.2% in their respective layers.

5. A blister packaging according to claim 1 characterised in that prior to thermoforming the web (30) has a total thickness of 200-600 µm, preferably 150 to 500 µm, more preferably 250 to 400 µm, and/or in that the lid (20) has a total thickness of 30-300 µm, preferably 50 to 200 µm, most preferably 80 to 110 µm.

6. A blister packaging according to claim 1 characterised in that the overall polyolefin content of the blister packaging without a product is above 90%, preferably above 96%.

7. A blister packaging according to claim 1 characterised in that the web and the lid both contain an oxygen barrier layer.

8. A blister packaging according to claim 1, characterised in that the elongation at break of the lid is below 20%, preferably below 10%.

9. A blister packaging according to claim 1, characterised in that the inner sealing layer (26) of the lid (20) consists mainly of an ethylene copolymer, preferably a copolymer comprising Ethylene and vinyl acetate.

10. A blister packaging according to claim 1, characterised in that the inner sealing layer (26) of the lid (20) has a thickness of about 5 to 30 µm, preferably of about 15 to 25 µm.

11. A blister packaging according to claim 1 characterised in that the inner sealing layer (26) of the lid (20) comprises up to 2%, preferably up to 1% by weight of a slip agent.

12. A blister packaging according to claim 1 characterised in that the third additive in the intermediate HDPE layer (24) of the lid (20) is an inorganic additive, preferably selected from $CaCO_3$, $TiO_2$, Talc, chalk, clay or a metallic salt.

13. A blister packaging according to claim 1, characterised in that the third additive in the intermediate HDPE layer (24) of the lid (20) is a polymer which is incompatible with HDPE.

14. A blister packaging according to claim 1 characterised in that the sealing layer (36) of the thermoformed web (30) comprises 88% to 95% of HDPE and 5%-12% of LLDPE by weight, and/or that the LLDPE is metallocene LLDPE.

15. A blister packaging according to claim 1 characterised in that thermoformed web (30) further comprises an outer layer (32) comprising HDPE as the main ingredient.

16. A packaged pharmaceutical or nutritional product, comprising a blister packaging according to claim 1, and a pharmaceutical or nutritional product (40) in solid form contained in the cavities.

17. A method for producing a packaged product according to claim 16, said method comprising the following steps:
   preheating a web material comprising at least two co-extruded layers: a main layer comprising HDPE and up to 2% of a first additive, and a sealing layer comprising HDPE and at most 50% of LLDPE
   thermoforming the web material to form a web with cavities therein,
   introducing a pharmaceutical or nutritional product in solid form into each cavity,
   preheating a lid material comprising at least three co-extruded layers: an outer HDPE layer containing up to 5% of a second additive, an intermediate HDPE layer comprising an additive suitable to decrease elongation at break, and an inner sealing layer,
   sealing the inner sealing layer of the lid on the sealing layer of the web between the cavities using a heated sealing roll, and
   cutting the resulting product into blister packaging of a desired format.

18. A method according to claim 17, wherein the first additive in the main layer of the web material is an inorganic additive.

19. A method according to claim 17, wherein the second additive in the outer HDPE layer of the lid is an inorganic additive.

* * * * *